United States Patent [19]

Pierce et al.

[11] Patent Number: 4,711,726
[45] Date of Patent: Dec. 8, 1987

[54] CARBOXYLATE N-VINYLAMIDE COPOLYMERS FOR INTERNAL SCALE CONTROL AND PASSIVATION IN HIGH PRESSURE BOILER SYSTEMS

[75] Inventors: Claudia C. Pierce; Robert S. Robinson, both of Naperville; James F. Kneller, LaGrange Park, all of Ill.

[73] Assignee: Nalco Chemical Company, Naperville, Ill.

[21] Appl. No.: 947,060

[22] Filed: Dec. 29, 1986

[51] Int. Cl.[4] ............................................. C02F 5/12
[52] U.S. Cl. ...................................... 210/701; 134/3; 252/82; 252/180; 422/16
[58] Field of Search ............................... 210/698–701; 252/180, 181, 82; 134/3; 422/16

[56] References Cited

U.S. PATENT DOCUMENTS

| | | | |
|---|---|---|---|
| 3,806,367 | 4/1974 | Lange et al. | 210/701 |
| 3,900,338 | 8/1975 | Rumpf et al. | 210/701 |
| 3,962,110 | 6/1976 | Tate | 252/180 |
| 4,271,058 | 6/1981 | Trabitzsch et al. | 422/16 |
| 4,532,046 | 7/1985 | Meunier et al. | 210/698 |
| 4,673,508 | 6/1987 | Coleman et al. | 210/698 |

*Primary Examiner*—Peter Hruskoci
*Attorney, Agent, or Firm*—John G. Premo; Anthony L. Cupoli; Donald G. Epple

[57] ABSTRACT

Copolymers of acrylic or methacrylic acid with certain N-vinyl amides are excellent treating agents to prevent scale and corrosion caused by boiler waters in contact with heat transfer surfaces.

2 Claims, 1 Drawing Figure

PASSIVATION OF POLYMERS AS A FUNCTION OF PRESSURE
MAC=POLYMER B; AC/AM=POLYMER C; MAC/NVP=POLYMER F; BLANK=NO TREATMENT

PASSIVATION OF POLYMERS AS A FUNCTION OF PRESSURE
MAC=POLYMER B; AC/AM=POLYMER C; MAC/NVP=POLYMER F; BLANK=NO TREATMENT

CARBOXYLATE N-VINYLAMIDE COPOLYMERS FOR INTERNAL SCALE CONTROL AND PASSIVATION IN HIGH PRESSURE BOILER SYSTEMS

INTRODUCTION

In U.S. Pat. No. 4,457,847, there is described the use of certain water-soluble sequesterant anionic vinyl polymers for treating the hardness present in boiler waters to prevent scale formation and to remove scale formed on such heat transfer surfaces. It is also mentioned in this patent that certain of the polymeric agents used provide enhanced passivation of the boiler heat transfer surfaces by forming a black magnetite film on such surfaces.

The invention described in U.S. Pat. No. 4,457,847 teaches the use of a specific class of anionic polymers, either alone or in combination with certain polymeric dispersants, to provide an improved composition and method for preventing and removing scale on heat transfer surfaces in contact with boiler waters. The disclosure of U.S. Pat. No. 4,457,847 is incorporated herein by reference. While as mentioned above, the treatments described in U.S. Pat. No. 4,457,847 occasionally form a corrosion-preventing passivating film on boiler heat transfer surfaces, such films are not always formed.

If it were possible to provide certain water-soluble sequesterant anionic vinyl polymers which could be used in the practice of U.S. Pat. No. 4,457,847 which would in addition to providing scale prevention and removal while at the same time predictably and uniformly forming a passivating black magnetite-type film on the heat transfer surfaces in contact with boiler waters, an advance in the art would be afforded.

THE INVENTION

In its broadest aspect, the invention comprises a method of treating boiler waters which are in contact with heat transfer surfaces to prevent formation of scale on, to remove previously formed scale from, and to form a corrosion resistant surface on these heat transfer surfaces which comprises treating the boiler waters with at least 3 ppm of a water-soluble copolymer which contains from 30-95 mole percent of acrylic acid or methacrylic acid, and an N-vinylamide from the group consisting of N-vinylacetamide, N-vinyl-N-methylacetamide, N-vinylpyrrolidone, N-vinylpiperidone, N-vinylcaprolactam, N-vinylsuccinimide, N-vinylphthalimide, N-vinyloxazolone and N-vinylformamide, said copolymer having a molecular weight within the range of 1,000-100,000.

Molar Ratio of the Acrylic Acid or Methacrylic Acid to the N-VinylAmides

In its broadest aspect, the invention comprises using copolymers which contain 30–95 mole percent of acrylic or methacrylic acid in relation to the N-vinylamide contained in the copolymers. In a present embodiment, the content of the acrylic acid or methacrylic acid in the polymer is 60-95 mole percent in relation to the N-vinylamide content of the copolymer.

While the anionic portion of the copolymer is referred herein and in the claims as acrylic or methacrylic acid, it is understood that under alkaline conditions in the boiler they are converted to their alkali metal or alkaline earth metal salt forms. Also, the copolymers, prior to being used to practice the method of the invention, may be prepared and used in the form of their alkali metal salts such as for instance their sodium salt form. The most preferred copolymers contain methacrylic acid and N-Vinylpyrrolidone.

Molecular Weight

The copolymers have molecular weights within the range of 1,000–100,000 with a preferred molecular weight range being within the range of 10,000–50,000.

Operating Conditions of the Boiler and the Boiler Water Environment and Dosage of the Polymer The invention shows its most promising results when the boiler water into which the copolymers are placed, has a pH of at least 8.5 and preferably between 11–12.0. The polymers are most conveniently added to the feed water where their dosage can be monitored.

The invention shows the greatest benefits in scale and corrosion prevention when it is used to treat boilers operating at a pressure of at least 800 psi with a preferred operating pressure being about 1,500 psi or greater.

The polymers are added to the feed water at a dosage of at least 3 ppm with a preferred dosage being with the range of 3–30 ppm, and a most preferred range being 5–20 ppm.

To optimize the invention, it is beneficial if the heat transfer surfaces of the boiler be in a fairly good state of cleanliness prior to using the copolymers.

Althouth not essential, it is helpful if the copolymers of the invention, when used to treat boiler waters, are combined with so-called dispersant polymers as taught in U.S. Pat. No. 4,457,847.

EVALUATION OF THE INVENTION

Figure 1:
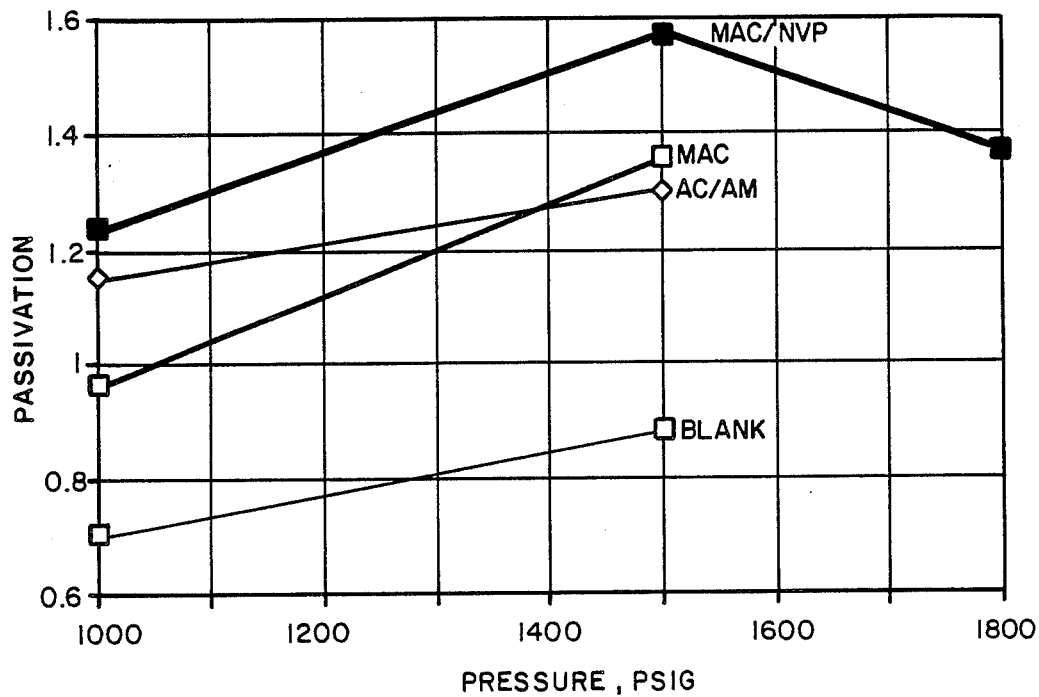
FIG. 1 shows comparative passivation results using the instant copolymer.

Experimental scale boilers used were the same as those described in U.S. Pat. No. 4,457,847. Iron transport was calculated based on feeding iron through a once through pressurized reactor at 400° F. and measuring the amount of iron at the outlet of the reactor. Passivation was measured by coulometric reduction of the oxide layer formed on heat transfer surfaces by the polymer.

Table I shows the description of the polymers tested.

TABLE I

Polymers Tested

| Polymer | Polymer Identification | Average MW |
| --- | --- | --- |
| Polymer A | Polyacrylic acid | 30,000 |
| Polymer B | Polymethacrylic Acid | 28,000 |
| Polymer C* | Acrylic Acid/Acrylamide 70/30 | 32,000 |
| Polymer D* | Methacrylic Acid/N—vinylpyrrolidone 50/50 | 42,700 |
| Polymer E* | Methacrylic Acid/N—vinylpyrrolidone 70/30 | 38,000 |
| Polymer F* | Methacrylic Acid/N—vinylpyrrolidone 80/20 | 36,000 |

*Ratios are monomer mole ratios.

A comparison of the passivation enhancement of the methacrylic/N-vinylpyrrolidone copolymer with the existing low molecular weight acrylic/acrylamide copolymer and methacrylic homopolymer is shown in Table II. The passivation values are normalized to that of the carboxylate homopolymer.

At 1,500 psi, all copolymers containing 80% methacrylic acid show better passivation than copolymers of acrylic acid as shown in the drawing. This is due to the higher thermal stability and improved passivation of the methacrylic acid polymers.

TABLE II

Passivation of Polymers
(normalized to Polymethacrylic acid)

| Pressure (psig) | Blank | Polymer B | Polymer C | Polymer F |
|---|---|---|---|---|
| 1,000 | 0.74 | 1.00 | 1.23 | 1.31 |
| 1,500 | 0.66 | 1.00 | 0.96 | 1.16 |

Blank = no treatment

Table III shows that methacrylic homopolymer and methacrylic/N-vinylpyrrolidone copolymer are superior to acrylic and acrylic/acrylamide copolymers on a dosage/performance basis at 1,500 psig. Methacrylic/N-vinylpyrrolidone copolymer can be used at 1,800 psig (See Table IV). At both pressures very low levels of ammonia are released into the steam.

Table V shows that methacrylic N-vinylpyrrolidone copolymers are also good iron dispersing agents, since they are as effective as an acrylic/acrylamide copolymer, both being superior to acrylic and methacrylic homopolymers.

TABLE III

Scale Boiler Results
(1,500 psig - 1 ppm Ca, 0.5 ppm Mg, 0.5 ppm $SiO_2$ -
10 cycles - 110,000 Btu/ft$^2$ hr)

| Polymer | Treatment Ratio* | % Ca Recovery | % Mg Recovery | % $SiO_2$ Recovery | ppm $NH_3$ |
|---|---|---|---|---|---|
| Blank | — | 37 | 3 | 63 | <0.05 |
| Polymer A | 7.7/1 | 87 | 70 | 98 | <0.05 |
| Polymer B | 7.5/1 | 101 | 103 | 107 | <0.05 |
| Polymer C | 7.7/1 | 80 | 91 | 87 | 1.30 |
|  | 12.0/1 | 88 | 87 | 90 | 1.60 |
|  | 14.0/1 | 89 | 89 | 84 | 2.30 |
| Polymer F | 7.5/1 | 111 | 94 | 106 | 0.28 |
|  | 7.7/1 | 114 | 99 | 100 | 0.27 |

*Defined as ppm active polymer per ppm total hardness
Blank = no treatment

TABLE IV

Scale Boiler Results
(1,800 psig - 1 ppm Ca, 0.5 ppm Mg, 0.5 ppm $SiO_2$ -
10 cycles - 110,000 Btu/ft$^2$ hr.)

| Polymer | Treatment Ratio* | % Ca Recovery | % Mg Recovery | % $SiO_2$ Recovery | ppm $NH_3$ |
|---|---|---|---|---|---|
| Polymer F | 10.0/1 | 100 | 85 | 99 | 0.10 |
|  | 12.0/1 | 109 | 85 | 107 | 0.23 |

*Defined as ppm active polymer per ppm total hardness.

TABLE V

| Polymer | % Iron Transport |
|---|---|
| Blank | 28 |
| Polymer A | 68 |
| Polymer B | 67 |
| Polymer C | 78 |
| Polymer D | 79 |
| Polymer E | 80 |
| Polymer F | 79 |

Blank = no treatment

Advantages of the Invention

The polymers described as useful enhance the formation of corrosion-resistant oxide films in boiler systems during boiler operation. The polymers promote the formation of a passive film with almost twice the corrosion resistance of a film formed under untreated conditions.

This passivating behavior has been observed in an earlier product, a low molecular weight acrylamide and methacrylic acid or acrylic acid and acrylamide copolymers. The invention described and claimed possesses several advantages over the low molecular weight acrylamide and methacrylic acid copolymer and copolymers containing acrylamide.

1. The N-vinylpyrrolidone copolymer gives lower hydrolytic release of ammonia, which can cause corrosion of copper-containing alloys.

2. The use of a methacrylic acid backbone gives higher thermal stability. This effect is observable at higher pressures. At 1,500 psi, all copolymers containing ≧80% methacrylic acid show better passivation than similar copolymers of acrylic acid.

3. As the pressure of the boiler increases, so does the corresponding polymer dosage required to insure adequate recoveries of hardness, silica and iron. The increase in polymer dosage is due to the thermal decomposition of the polymer. The N-vinylpyrrolidone copolymer is very effective on a dosage/performance basis for high pressure application (≧1,500 psi). It is superior to acrylic acid/acrylamide copolymer and acrylic acid homopolymers regarding hardness, silica and iron recoveries.

Having thus described our invention, we claim:

1. A method of treating boiler waters having a pH of at least 8.5 which are in contact with heat transfer surfaces to prevent formation of scale on, to remove previously formed scale from, and to form a corrosion resistant surface on these heat transfer surfaces which comprises treating the boiler waters which are found in boilers operating at a pressure of at least 800 psi with at least 3 ppm of a water-soluble copolymer which contains from 60–95 mole percent of methacrylic acid, and 5–40 mole percent of N-vinylpryrrolidone, said copolymer having a molecular weight within the range of 10,000–50,000.

2. The method of claim 1 where the boiler is operating at a pressure of at least 1,500 psi.

* * * * *